(12) United States Patent
Maus et al.

(10) Patent No.: US 7,981,498 B2
(45) Date of Patent: Jul. 19, 2011

(54) HONEYCOMB BODY WITH INTERNAL CAVITIES

(75) Inventors: Wolfgang Maus, Bergisch Gladbach (DE); Rolf Brück, Bergisch Gladbach (DE); Peter Hirth, Bonn (DE)

(73) Assignee: EMITEC Gesellschaft fuer Emissionstechnologies mbH, Lohmar (DE)

( * ) Notice: Subject to any disclaimer, the term of this patent is extended or adjusted under 35 U.S.C. 154(b) by 61 days.

(21) Appl. No.: 11/841,012

(22) Filed: Aug. 20, 2007

(65) Prior Publication Data

US 2007/0292707 A1 Dec. 20, 2007

Related U.S. Application Data

(63) Continuation of application No. PCT/EP2006/001449, filed on Feb. 17, 2006.

(30) Foreign Application Priority Data

Feb. 18, 2005 (DE) .......................... 10 2005 007 403

(51) Int. Cl.
*B32B 3/12* (2006.01)
(52) U.S. Cl. ....................................................... 428/116
(58) Field of Classification Search .................. 428/116, 428/119, 188, 307.5, 304.4, 593, 603, 180, 428/596, 527.22; 55/529, 502, 523, 585.3, 55/483; 29/890
See application file for complete search history.

(56) References Cited

U.S. PATENT DOCUMENTS

| | | | |
|---|---|---|---|
| 3,983,283 A * | 9/1976 | Bagley .......................... 428/116 |
| 4,273,681 A | 6/1981 | Nonnenmann | |
| 4,283,210 A * | 8/1981 | Mochida et al. ................. 55/523 |
| 4,390,355 A * | 6/1983 | Hammond et al. ............. 55/523 |
| 4,455,281 A * | 6/1984 | Ishida et al. ................... 422/171 |
| 4,568,402 A * | 2/1986 | Ogawa et al. .............. 156/89.22 |
| 4,803,189 A | 2/1989 | Swars | |
| 4,832,998 A | 5/1989 | Cyron | |
| 4,923,109 A | 5/1990 | Cyron | |
| 4,946,822 A | 8/1990 | Swars | |
| 5,045,403 A | 9/1991 | Maus et al. | |
| 5,105,539 A | 4/1992 | Maus et al. | |

(Continued)

FOREIGN PATENT DOCUMENTS

DE 2902779 A1 7/1980

(Continued)

*Primary Examiner* — David R Sample
*Assistant Examiner* — Nicole T Gugliotta
(74) *Attorney, Agent, or Firm* — Laurence A. Greenberg; Werner H Stemer; Ralph E. Locher

(57) ABSTRACT

A honeycomb body, especially a particulate filter, particularly for motor vehicle exhaust purification, includes inner walls defining passages with an entry and exit. Cavities free of walls in at least one subregion contain at least one spherical free space having a largest cross-sectional area at least 10 times a cross-sectional area of the passages in the subregion. The honeycomb body is wound, twisted or layered from at least one metal sheet having layers with a structuring forming the passages, at least in the subregion. The sheet-metal layers have holes with an area greater than 10 times the cross-sectional area of the passages in the subregion. The holes form cavities in at least 5 successive layers overlapping with an area at least 10 times the cross-sectional area of the passages in the subregion. The holes are double or more than triple the hydraulic diameter of the passages opening into the cavity.

32 Claims, 2 Drawing Sheets

U.S. PATENT DOCUMENTS

| | | | |
|---|---|---|---|
| 5,130,208 A | 7/1992 | Maus et al. | |
| 5,139,844 A | 8/1992 | Maus et al. | |
| 5,157,010 A | 10/1992 | Maus et al. | |
| 5,278,125 A * | 1/1994 | Iida et al. | 502/439 |
| 5,384,099 A * | 1/1995 | Sheller | 422/174 |
| 5,384,100 A | 1/1995 | Freund | |
| 5,403,559 A | 4/1995 | Swars | |
| 5,567,395 A | 10/1996 | Okabe et al. | |
| 5,820,835 A * | 10/1998 | Sheller et al. | 422/180 |
| 5,853,402 A * | 12/1998 | Faulks et al. | 604/378 |
| 6,190,784 B1 | 2/2001 | Maus et al. | |
| 6,761,980 B2 * | 7/2004 | Sato et al. | 428/593 |
| 7,030,059 B2 | 4/2006 | Tanabe | |
| 7,083,860 B2 | 8/2006 | Maus et al. | |
| 2002/0162319 A1 * | 11/2002 | Crocker et al. | 60/274 |
| 2004/0121908 A1 | 6/2004 | Tanabe | |
| 2005/0016140 A1 * | 1/2005 | Komori et al. | 55/523 |
| 2005/0170957 A1 | 8/2005 | Maus et al. | |

FOREIGN PATENT DOCUMENTS

| | | |
|---|---|---|
| EP | 0245737 B1 | 4/1987 |
| EP | 0587074 A | 3/1994 |
| EP | 1428577 A1 | 6/2004 |
| JP | 01193013 A | 8/1989 |
| WO | 9003220 A1 | 4/1990 |
| WO | 9008249 A1 | 7/1990 |
| WO | 9101178 A1 | 2/1991 |
| WO | 9101807 A1 | 2/1991 |
| WO | 9749905 A1 | 12/1997 |
| WO | 2004022937 A1 | 3/2004 |

* cited by examiner

HONEYCOMB BODY WITH INTERNAL CAVITIES

CROSS-REFERENCE TO RELATED APPLICATION

This is a continuation, under 35 U.S.C. §120, of copending International Application No. PCT/EP2006/001449, filed Feb. 17, 2006, which designated the United States; this application also claims the priority, under 35 U.S.C. §119, of German Patent Application DE 10 2005 007 403.0, filed Feb. 18, 2005; the prior applications are herewith incorporated by reference in their entirety.

BACKGROUND OF THE INVENTION

Field of the Invention

The present invention relates to a honeycomb body, in particular for purifying exhaust gas from an internal combustion engine. Such honeycomb bodies may have metallic or ceramic base structures and are used to provide a large surface area, which interacts with exhaust gas, in an exhaust system. In particular, the honeycomb bodies are coated with catalytically active material and/or constructed in such a way that they can separate fine particulates out of the exhaust gas and convert them. Furthermore, the honeycomb bodies are also coated with adsorber material which is used for the temporary adsorption of pollutants, in particular hydrocarbons and/or nitrogen oxides.

Honeycomb bodies of that type typically have a multiplicity of passages which run approximately parallel and lead from an entry surface to an exit surface of the honeycomb body. Therefore, in the installed state, exhaust gas flows through such a honeycomb body more or less uniformly in a direction of flow, and the distribution of the exhaust gas between the individual passages of the honeycomb body is initially dependent mainly on the flow profile at the entry surface. The prior art has also disclosed numerous measures which influence the flow in the individual passages and/or the flow distribution in the honeycomb body. Highly developed metallic honeycomb bodies which are constructed from individual sheet-metal layers often use various known measures to optimize the flow properties of a honeycomb body. A distinction is drawn in particular between two typical forms of metallic honeycomb bodies. An early form, of which German Published, Non-Prosecuted Patent Application DE 29 02 779 A1, corresponding to U.S. Pat. No. 4,273,681, shows typical examples, is the helical form, in which substantially one smooth and one corrugated sheet-metal layer are placed on top of one another and wound helically. In another form, the honeycomb body is built up from a multiplicity of alternately disposed smooth and corrugated or differently corrugated sheet-metal layers, with the sheet-metal layers initially forming one or more stacks which are intertwined. In that case, the ends of all of the sheet-metal layers come to lie on the outer side and can be connected to a housing or tubular casing, producing numerous connections which increase the durability of the honeycomb body. Typical examples of those forms are described in European Patent EP 0 245 737 B1, corresponding to U.S. Pat. Nos. 4,832,998, 4,803,189, 4,946, 822 and 4,923,109, or International Publication No. WO 90/03220, corresponding to U.S. Pat. Nos. 5,105,539 and 5,139,844. It has also long been known for the sheet-metal layers to be equipped with additional structures for influencing the flow and/or effecting cross-mixing between the individual flow passages. Typical examples of configurations of that type are International Publication No. WO 91/01178, corresponding to U.S. Pat. No. 5,403,559, International Publication No. WO 91/01807, corresponding to U.S. Pat. Nos. 5,130,208 and 5,045,403, and International Publication No. WO 90/08249, corresponding to U.S. Pat. No. 5,157,010. Finally, there are also honeycomb bodies in conical form, if appropriate also with further additional structures for influencing flow. A honeycomb body of that type is described, for example, in International Publication No. WO 97/49905, corresponding to U.S. Pat. No. 6,190,784.

The present invention is based on International Publication No. WO 2004/022937 A1, corresponding to U.S. Patent Application Publication No. US 2005/0170957 and U.S. Pat. No. 7,083,860. It is known from that document to produce honeycomb bodies from perforated sheet-metal layers. The holes in the sheet-metal layers may be larger than the cross section of the passages. Honeycomb bodies made from perforated sheet-metal layers of that type have particularly favorable properties with regard to the distribution of the flow in their interior, since pressure differences in the individual passages are equalized by the holes, and at the same time the gas flowing through is swirled up, which improves the contact between it and the surfaces. The number and position of the holes can be varied within wide boundaries, so that it is possible to produce honeycomb bodies which are adapted to different conditions.

Moreover, International Publication No. WO 2004/022937 A1, corresponding to U.S. Patent Application Publication No. US 2005/0170957 and U.S. Pat. No. 7,083,860, describes how it is possible to produce a large hollow space, for example for accommodating a lambda sensor, in a honeycomb body, by forming suitable cutouts in the individual sheet-metal layers during production. Modern manufacturing techniques allow the accurate predetermination of the location in a honeycomb body to be produced at which a hollow space is to be formed. For further details, reference is made to International Publication No. WO 2004/022937 A1, corresponding to U.S. Patent Application Publication No. US 2005/0170957 and U.S. Pat. No. 7,083,860, the content of the disclosure of which is hereby incorporated by reference into the instant application in full.

European Patent Application EP 1 428 577 A1, corresponding to U.S. Patent Application Publication No. US 2004/0121908 and U.S. Pat. No. 7,030,059 also describes a honeycomb body with holes in its sheet-metal layers. That honeycomb body is wound helically from one smooth metal sheet and one corrugated metal sheet. Of course, in all processes for producing honeycomb bodies from metallic sheet-metal layers with holes, the situation may arise in which some holes in successive sheet-metal layers are approximately aligned with one another. That gives rise to larger hollow spaces, referred to below as cavities, more or less randomly in a honeycomb body. Without special measures, in particular if the holes are disposed evenly on the sheet-metal layers, those cavities are very irregular in form and in particular are generally greatly curved or even interrupted in the outer region of a honeycomb body, depending on the ratio of the foil surface area to the surface area of the holes.

It has now emerged that for various applications, in particular for eliminating particulates from an exhaust gas, it is particularly advantageous if a relatively large number of cavities which have relatively large dimensions in all directions are formed in a honeycomb body. The difficulty in describing the properties of cavities of that type is that those cavities are not surrounded by continuous walls, but rather are defined by holes which are more or less aligned with one another in smooth and corrugated sheet-metal layers. The edges of the holes form a type of envelope for the cavity. One way of describing such cavities, which are advantageous for the properties of a honeycomb body, is to indicate how large a sphere would be accommodated in a cavity. Therefore, in the text which follows as well as with reference to the drawing, it is attempted, inter alia, to describe the properties of cavities on the basis of the largest sphere which could be accommodated in a cavity. It will be immediately clear that it is impossible for any cavity in a honeycomb body to accommodate spheres which are larger than spheres which would fit through the holes in the foils. The size of the sphere which fits into a cavity is therefore determined on one hand by the size of the holes and on the other hand by the degree of overlap between adjacent holes.

It should also be pointed out that when considering holes in a corrugated foil for the present invention it is always only the projection of the holes onto the center plane of a corrugated foil which is considered. The form of corrugation does not play a significant role in the present invention and the formation of cavities, but rather it is only the size of the projection of the holes within a corrugated sheet-metal layer which does so. However, the corrugation does play a role in the size of the passages in a honeycomb body. In the case of honeycomb bodies with a simple structure, all of the passages have approximately the same cross-sectional area, but there are also honeycomb bodies in which different passage cross-sectional areas occur within a defined region of the cross section. Therefore, the following text refers in general terms to the mean or average passage cross-sectional area, which in the simplest case means just the cross-sectional area of each passage, but in more complicated situations means, for a specific region of the cross section of a honeycomb body, the total cross-sectional area of the honeycomb body divided by the number of passages in that region of the cross section.

SUMMARY OF THE INVENTION

It is accordingly an object of the invention to provide a honeycomb body with internal cavities, which overcomes the hereinafore-mentioned disadvantages of the heretofore-known devices of this general type and which has improved properties with regard to flow conditions, pressure loss, conversion of pollutants and/or particulates in an exhaust gas.

With the foregoing and other objects in view there is provided, in accordance with the invention, a honeycomb body, in particular for purifying exhaust gas from an internal combustion engine. The honeycomb body comprises subregions, an entry surface and an exit surface. Inner walls define passages leading from the entry surface to the exit surface and having a mean cross-sectional area. A plurality of cavities are disposed in at least one of the subregions. The cavities are each free of the inner walls and shaped and dimensioned to contain at least one spherical free space. The at least one spherical free space has a largest cross-sectional area amounting to at least 10 times the mean cross-sectional area of the passages in the at least one subregion.

It has been found that although honeycomb bodies with numerous holes in their inner walls allow good compensation of pressure differences between the individual passages, rectilinear flow filaments may nevertheless form if there are not considerable pressure differences between adjacent passages. Those flow trains simply flow uniformly through relatively small hollow spaces, so that there is no particular cross-mixing or increased conversion or separation of particulates. That situation changes if the holes in the inner walls are disposed in such a way as to form at least one spherical free space, the largest cross-sectional area of which is at least ten times the mean cross-sectional area of the passages. This means that at least ten passages located closely together open out into the free space and lead out of it again on the opposite side. With a cavity of that type of size, at least considerable cross-mixing takes place, thereby promoting the desired processes within the honeycomb body. One necessary precondition is for the cross-sectional area of the holes in the inner walls which form the cavity likewise to be at least ten times the size of the mean passage cross-sectional area.

In accordance with another feature of the invention, which is important in particular for honeycomb bodies with a large number of passages per unit cross-sectional area, the largest cross-sectional area of the spherical free space amounts to 20 to 100 times, preferably 30 to 50 times, the mean cross-sectional area of the passages. This gives rise to cavities which are huge in relation to the passage sizes and in which swirling and cross-flows can form in particular in the case of a pulsating gas stream, which can lead to better conversion properties without excessive pressure loss.

In accordance with a further feature of the invention, it is actually advantageous if a large number of passages, for example 10 to 500 passages, open out into one cavity and lead out of it again.

In accordance with an added feature of the invention, in order to enable the favorable properties of the cavities according to the invention to have an effect on as much of the flow as possible in a honeycomb body, 50 to 100% of the passages of the honeycomb body should intersect at least one, preferably more than three, of the cavities. For stability reasons, it may be necessary for the cavities in a honeycomb body not to extend all the way to the outermost lateral surface, which means that under certain circumstances not all of the passages will intersect a cavity. Preferably, however, as many of the passages as possible should intersect one or preferably more of the cavities, in order to make use of their favorable properties.

In accordance with an additional feature of the invention, to this end it is advantageous for the cavities to be distributed uniformly over the volume of the honeycomb body.

In accordance with yet another feature of the invention, however, it does not present any difficulties either, and depending on the flow properties in an exhaust gas purification system it may be advantageous, to provide a non-uniform distribution, preferably with an accumulation in an inner region and/or in the direction of the entry surface or exit surface of the honeycomb body. This provides the option of adapting the invention to different applications.

In accordance with yet a further feature of the invention, depending on the way in which the cavities are introduced into a honeycomb body, the cavities themselves, of course, are not spherical. The spherical hollow space serves merely to provide a theoretical description of the dimensional conditions in a cavity. Cavities which actually occur tend to be in the form of cylinders or curved cylinders, in which case their axial extent preferably lies approximately perpendicular to the profile of the passages.

The description of the invention which has been given thus far is not restricted to honeycomb bodies made from sheet-metal layers, but rather can also be applied to ceramic honeycomb bodies, provided that suitable processes are used to produce the cavities. When producing ceramic honeycomb bodies, it is possible, for example, for blanks to be machined relatively easily prior to firing, and for cavities to be produced by punching or measures undertaken even as early as during extrusion.

With the objects of the invention in view, there is also provided a honeycomb body which is wound, twisted and/or layered from metal sheets. The honeycomb body has a multiplicity of at least partially structured sheet-metal layers, the structuring of which forms passages that lead from an entry surface to an exit surface of the honeycomb body. The term sheet-metal layers is to be understood as meaning the successive layers of the honeycomb body, irrespective of whether these sheet-metal layers include one or more separate metal sheets. It should be noted that in principle it is possible to construct a honeycomb body from just a single metal sheet, by part of the sheet-metal strip being corrugated and the remaining smooth part of the sheet-metal strip being folded onto the corrugated part by bending. The structure formed in this way can be wound helically, starting from the bending line, to form a honeycomb body. The next option is to use one smooth metal sheet and one corrugated metal sheet to produce a helically wound honeycomb body. Multiple-start spirals formed from three or more metal sheets are also possible. Finally, there is a large number of forms which are produced from one or more stacks of alternating smooth and corrugated metal sheets. Honeycomb bodies of this type include a multiplicity of metal sheets, although the number of metal sheets and the number of successive sheet-metal layers need not necessarily be identical. For this reason, a fundamental distinction can be drawn between a metal sheet and a sheet-metal layer, even if this is often not possible, for example, in drawings which show only part of a honeycomb body. For the present invention, the structural form in a first approximation plays no role, in which context it is easier, for honeycomb bodies of helical construction, to calculate the position of the holes to form cavities than for honeycomb bodies constructed from a large number of individual metal sheets. However, none of the structural forms present fundamental problems. A honeycomb body according to the invention comprises, at least in a subregion of the honeycomb body, sheet-metal layers having holes with an effective cross-sectional area which is greater than 10 times the mean cross-sectional area of the passages in the respective subregion, the holes being disposed and shaped in such a way that in the honeycomb body they form, together with holes of adjacent sheet-metal layers, cohesive, large-volume cavities as a result of holes in at least 5 successive sheet-metal layers overlapping one another, the overlap area of the respective holes in all of these 5 sheet-metal layers being at least 10 times the mean cross-sectional area of the passages in the subregion. As will be explained in more detail with reference to the drawing, some cavities are always formed in honeycomb bodies made from perforated sheet-metal layers. In extreme situations, it is even possible for all of the cavities to be connected to one another, which occurs whenever the surface area of the holes in each sheet-metal layer is larger than the remaining surface area of the sheet-metal layer. In the case of corrugated sheet-metal layers, the term effective surface area is used, and this is established by projecting the hole in a sheet-metal layer onto the center plane of the corrugated sheet-metal layer.

In the context of the present invention, it is important that the holes do not form small, branched hollow spaces in the honeycomb body, but rather form relatively large-volume cavities, which occurs specifically if holes in adjacent sheet-metal layers are virtually aligned with one another or overlap over a large area. The configuration according to the invention in turn leads to cavities having the desired properties. The shape of the holes can in principle be selected as desired, although it is recommended for mechanical reasons to select holes with rounded edges in order to avoid the formation of cracks. Moreover, in each case, the holes should connect three or more passages to one another transversely to the direction of flow.

In accordance with another feature of the invention, the holes should also have a certain minimum size in the direction of flow, namely at least double, preferably more than triple, the mean hydraulic diameter of the passages which open out into the cavity. The hydraulic diameter results from the cross-sectional area of a passage and its cross-sectional shape and except in the case of round passages is smaller than the maximum width of a passage.

In accordance with a further feature of the invention, in a preferred embodiment, the honeycomb body is cylindrical and is formed from one or more stacks of metal sheets. The metal sheets of each stack have a length L and a width B, where L is greater than B, and the metal sheets of each stack each have a large number of holes, the distances between which are substantially constant in all of the metal sheets of a stack in the direction of the width B, but are different in the direction of the length L. It is precisely this which is not the case in known forms of the prior art. In order to simplify production and due to the absence of knowledge of the invention, perforated metal sheets were typically provided with holes uniformly over their entire length, which specifically cannot lead to a honeycomb body according to the invention, either when helically winding sheet-metal layers or when producing a honeycomb body from one or more sheet-metal stacks.

In accordance with an added feature of the invention, in a preferred exemplary embodiment, a honeycomb body is formed by at least one metal sheet of a length L and a width B, where L is greater than B. The honeycomb body is wound helically, and the at least one metal sheet has a large number of holes which have approximately constant distances between them in the direction of the width, but have different distances between them in the direction of the length. The precise pattern of the holes depends on the respective conditions of use. A common factor of all wound honeycomb bodies, however, is that approximately constant distances between the holes are expediently required in the direction of the width of the metal sheets being used. In this way, the holes are already aligned with one another in the direction of flow for production reasons, without particular attention having to be paid to these distances. Only the distance between the holes in the longitudinal direction of each metal sheet need be correctly calculated. In this case, cavities can be deliberately bounded by leaving out individual holes at certain intervals, for example, or more cavities per revolution of a sheet-metal layer can be provided, for example in the outer region of a honeycomb body than in the interior of the honeycomb body by changing the pattern of holes.

In accordance with an additional feature of the invention, in order to compensate for certain manufacturing tolerances, it may be advantageous for the holes to be configured as elongate slots, in which case their extent transversely to the direction of the passages should be greater than in the direction of the passages.

In accordance with yet another feature of the invention, in their interior, the honeycomb bodies may additionally be provided with further structures in the metal sheets. All known measures for influencing the flow in the interior of a honeycomb body can be implemented in addition to the measures according to the invention described herein. The attachment within a housing and, for example, the formation of conical forms, may also take place in accordance with the measures known from the prior art.

In accordance with a concomitant feature of the invention, a honeycomb body according to the invention is suitable, in particular, as part of an exhaust-gas purification system of an internal combustion engine, in particular a diesel engine. A general preferred application area is the purification of exhaust gases in motor vehicles.

Other features which are considered as characteristic for the invention are set forth in the appended claims.

Although the invention is illustrated and described herein as embodied in a honeycomb body with internal cavities, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
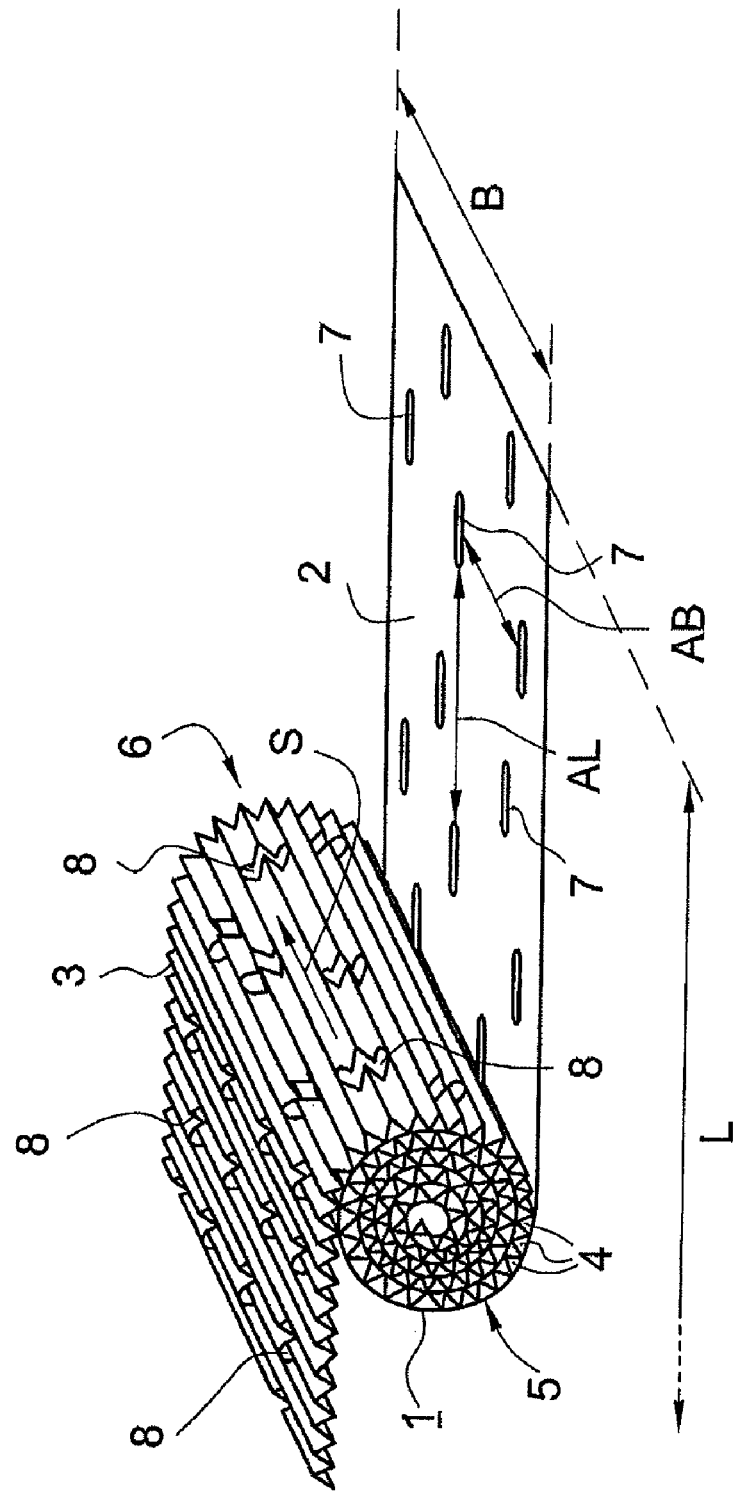
FIG. 1 is a diagrammatic, perspective view illustrating how a honeycomb body according to the invention is built up from perforated sheet-metal layers.

Referring now to the figures of the drawings in detail and first, particularly, to FIG. 1 thereof, there is seen a honeycomb body 1 which can be produced, for example, in helical form from one smooth metal sheet 2 and one corrugated metal sheet 3. The honeycomb body 1, the production of which has not yet been completed in the figure, has passages 4 which are formed by the structure of the corrugated metal sheet 3 and lead from an entry surface 5 to an exit surface 6 of the honeycomb body. An exhaust gas that is to be purified can flow through the honeycomb body 1 in a direction of flow S. The smooth metal sheet 2 has a width B and length L and is provided with a large number of holes 7. In the present example, the holes 7 are elongate slots with their longest extent in the direction of the length L of the smooth metal sheet 2, i.e. transversely to the subsequent direction of flow S. The corrugated metal sheet 3 also has numerous holes 8, which in the present case are likewise constructed as elongate slots running in the same direction. It can be seen that the holes 8 in the corrugated sheet-metal layer 3, when the sheet-metal layer is stretched out, must be considerably longer than the holes 7 in the smooth metal sheet, so that the dimensions of the holes 8 in the corrugated metal sheet 3 in the corrugated state approximately correspond to the dimensions of the holes 7 in the smooth metal sheet 2. For the purposes of the present invention, only the projection of the holes 8 in the corrugated metal sheet 3 onto the center plane of the corrugated metal sheet 3 is of importance. The distances AB between the holes 7, 8 with respect to the width B of the metal sheets 2, 3 are substantially constant, so that in this direction holes of adjacent sheet-metal layers always virtually completely overlap one another. However, it can be seen that if the holes 7, 8 are at the same distances from one another in the direction of the length L of the metal sheets 2, 3 as well, an offset between the holes would always ensue when the metal sheets are wound up since the diameter of the honeycomb body 1 to be wound increases. Therefore, in order to achieve large cavities having the properties according to the invention, the distance AL between the holes 7, 8 has to be adapted accordingly in the direction of the length L of the metal sheets 2, 3. The simplest option is to define, before production, where cavities of what dimensions are to be present in the honeycomb body, and then to establish what shape of holes are to be disposed at what positions in the metal sheets 2, 3. This operation may be of different complexity for different forms of honeycomb bodies, but can be managed without problems by simple tests and suitable control of the machines which produce the holes 7, 8. The holes 7, 8 in FIG. 1 are not necessarily to be regarded as having been drawn to scale, which means that according to the invention they could also be considerably larger.

Figure 2:
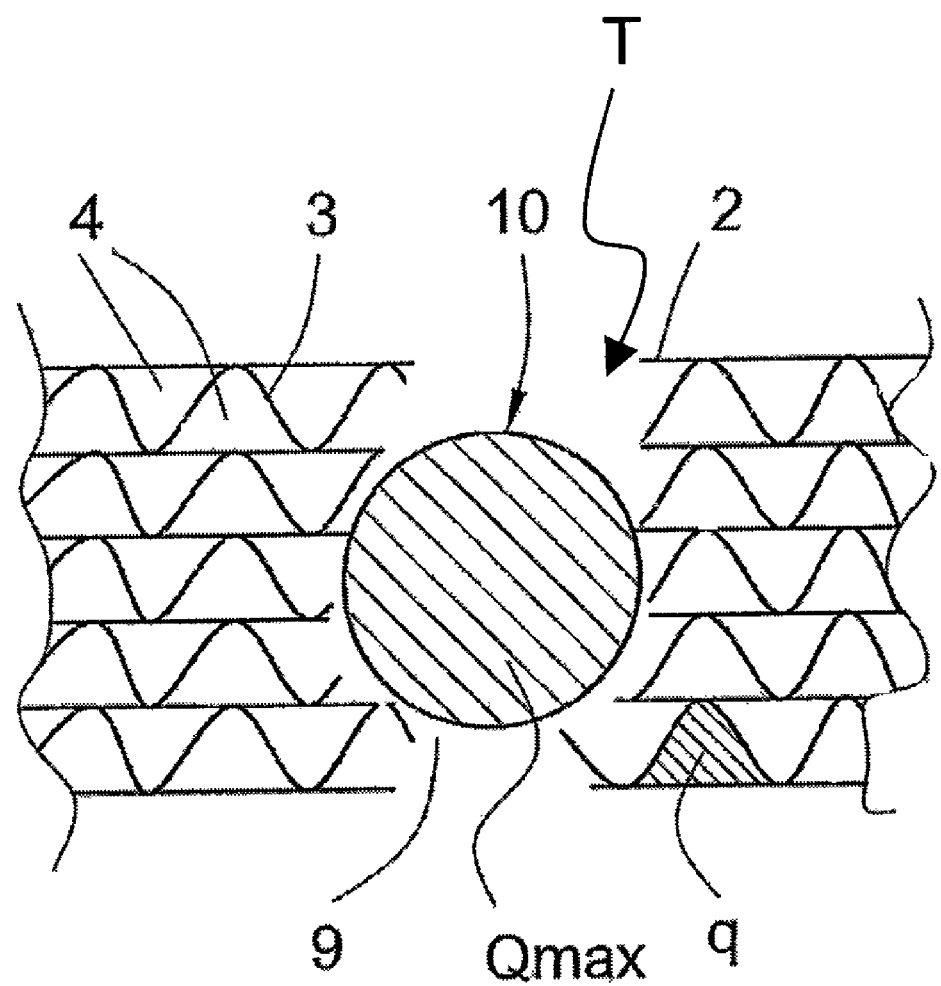
FIG. 2 is an enlarged, fragmentary, cross-sectional view of a region of a cavity in a honeycomb body according to the invention.

FIG. 2 diagrammatically illustrates a cross section through a honeycomb body in the region of a cavity 9 according to the invention. Smooth sheet-metal layers 2 and corrugated sheet-metal layers 3 are stacked on top of one another with holes in the sheet-metal layers 2, 3 substantially overlapping one another, thereby forming a free cavity 9 in a subregion T. This cavity 9 contains a spherical free space 10 with a maximum cross-sectional area Qmax, into which, therefore, a sphere of this diameter would theoretically fit. The maximum cross-sectional area Qmax of a sphere is to be understood as meaning the largest cross section of this sphere. As is also indicated by hatching in the drawing, each of the individual passages 4 has a cross-sectional area q, which in the present example is approximately equal for all the passages. However, there are also forms of honeycomb bodies in which different passage cross sections occur. In this case, it is easy to calculate a mean passage cross section q. The crucial factor in the present invention is for the cavities 9 to be sufficiently large and shaped in such a way that a spherical free space 10 having a largest cross-sectional area Qmax, which is at least ten times as large as the mean passage cross section q, fits into them. Embodiments in which spherical free spaces of even a significantly larger ratio fit into the cavities 9 are preferred, in particular for honeycomb bodies with large cell densities of, for example, 600 cpsi (cells per square inch) to over 1200 cpsi.

The present invention makes it possible to further improve the properties of highly developed honeycomb bodies for exhaust-gas purification systems, in particular with a view toward improved removal of particulates from an exhaust gas combined, at the same time, with favorable properties in terms of pressure loss, use of material and flow properties.

The invention claimed is:

1. A honeycomb body, comprising:
    an entry surface and an exit surface defining a honeycomb body width therebetween;
    subregions disposed between said entry surface and said exit surface;
    an inner region of said honeycomb body;
    layers, including adjacent layers, extended continuously across said honeycomb body width, having inner walls defining passages leading from said entry surface to said exit surface, said passages having a mean cross-sectional area;
    a plurality of cavities disposed in said layers in at least one of said subregions, said cavities each being defined by a plurality of mutually aligned holes in said adjacent layers, being free of said inner walls and being shaped and dimensioned to contain at least one spherical free space, said plurality of cavities being accumulated in said inner region of said honeycomb body;
    said at least one spherical free space having a largest cross-sectional area amounting to at least 10 times said mean cross-sectional area of said passages in said at least one subregion; and
    not all of said passages intersect a cavity.

2. The honeycomb body according to claim 1, wherein said largest cross-sectional area of said at least one spherical free space amounts to 20 to 100 times said mean cross-sectional area of said passages.

3. The honeycomb body according to claim 1, wherein said largest cross-sectional area of said at least one spherical free space amounts to 30 to 50 times said mean cross-sectional area of said passages.

4. The honeycomb body according to claim 1, wherein said cavities each intersect 10 to 500 passages.

5. The honeycomb body according to claim 1, wherein 50 to 100% of said passages intersect at least one of said cavities.

6. The honeycomb body according to claim 1, wherein said cavities are distributed uniformly over a volume of the honeycomb body.

7. The honeycomb body according to claim 1, wherein said cavities are distributed non-uniformly within the honeycomb body.

8. The honeycomb body according to claim 7, wherein said cavities have an accumulation in a direction of said entry surface or said exit surface.

9. The honeycomb body according to claim 1, wherein said cavities have an approximately cylindrical or curved cylindrical shape.

10. The honeycomb body according to claim 9, wherein said cavities have an axial extent approximately perpendicular to a profile of said passages.

11. The honeycomb body according to claim 1, wherein:
said inner walls are formed of at least one metal sheet in at least one stack of metal sheets formed into a cylindrical honeycomb body;
said metal sheets of each of said at least one stack have a length and a width and said length is greater than said width; and
said metal sheets of each of said at least one stack each have a large number of said holes spaced apart by distances which are substantially constant in all of said metal sheets of a stack in direction of said width but are different in direction of said length.

12. The honeycomb body according to claim 1, wherein:
said inner walls are formed of at least one metal sheet wound helically into the honeycomb body;
said at least one metal sheet has a length and a width and said length is greater than said width; and
said at least one metal sheet has a large number of said holes being spaced apart by approximately constant distances in direction of said width but by different distances in direction of said length.

13. The honeycomb body according to claim 1, wherein the honeycomb body is part of an exhaust-gas purification system of an internal combustion engine and contributes to removal of particulates from exhaust gas from the internal combustion engine.

14. The honeycomb body according to claim 13, wherein the internal combustion engine is a diesel engine.

15. A honeycomb body for purifying exhaust gas from an internal combustion engine, the honeycomb body comprising:
an entry surface and an exit surface defining a honeycomb body width therebetween;
subregions disposed between said entry surface and said exit surface;
an inner region of the honeycomb body;
layers, including adjacent layers, extended continuously across said honeycomb body width, having inner walls defining passages leading from said entry surface to said exit surface, said passages having a mean cross-sectional area for conducting the internal combustion engine exhaust gas to be purified;
a plurality of cavities disposed in said layers in at least one of said subregions, said cavities each being defined by a plurality of mutually aligned holes in said adjacent layers, being free of said inner walls and being shaped and dimensioned to contain at least one spherical free space, said plurality of cavities being accumulated in said inner region of the honeycomb body;
said at least one spherical free space having a largest cross-sectional area amounting to at least 10 times said mean cross-sectional area of said passages in said at least one subregion; and
not all of said passages intersect a cavity.

16. A honeycomb body, comprising:
an entry surface and an exit surface defining a direction of flow and defining a honeycomb body width therebetween;
subregions disposed between said entry surface and said exit surface;
an inner region of the honeycomb body;
at least one metal sheet being at least one of wound, twisted or layered to form layers, including adjacent layers, extended continuously across said honeycomb body width, said at least one metal sheet including a multiplicity of at least partially structured sheet-metal layers having a structuring forming passages leading from said entry surface to said exit surface, said passages having a mean cross-sectional area and a mean hydraulic diameter;
said sheet-metal layers in at least one of said subregions having holes with an effective cross-sectional area being greater than ten times said mean cross-sectional area of said passages in said at least one subregion;
said holes being disposed and shaped to form cohesive, large-volume cavities in said layers together with holes in said adjacent sheet-metal layers, by mutual overlapping of said holes in at least a successive five of said sheet-metal layers, said cavities each being defined by a plurality of mutually aligned holes in adjacent layers and said cavities being accumulated in said inner region of the honeycomb body;
said overlapping of said holes defining an overlap area of said holes in all of said at least five sheet-metal layers being at least ten times said mean cross-sectional area of said passages in said at least one subregion;
said holes having an extent in said direction of flow amounting to at least double said mean hydraulic diameter of said passages opening out into said cavities; and
not all of said passages intersect a cavity.

17. The honeycomb body according to claim 16, wherein said extent of said holes in said direction of flow amounts to more than triple said mean hydraulic diameter of said passages opening out into said cavities.

18. The honeycomb body according to claim 16, wherein:
said at least one metal sheet includes at least one stack of metal sheets formed into a cylindrical honeycomb body;
said metal sheets of each of said at least one stack have a length and a width and said length is greater than said width; and
said metal sheets of each of said at least one stack each have a large number of said holes spaced apart by distances which are substantially constant in all of said metal sheets of a stack in direction of said width but are different in direction of said length.

19. The honeycomb body according to claim 16, wherein:
said at least one metal sheet is wound helically into the honeycomb body;
said at least one metal sheet has a length and a width and said length is greater than said width; and
said at least one metal sheet has a large number of said holes being spaced apart by approximately constant distances in direction of said width but by different distances in direction of said length.

20. The honeycomb body according to claim 16, wherein at least some of said holes have a smaller extent in a direction of said passages than transversely to said direction of said passages.

21. The honeycomb body according to claim 20, wherein said holes are elongate slots.

22. The honeycomb body according to claim 16, wherein the honeycomb body is part of an exhaust-gas purification system of an internal combustion engine and contributes to removal of particulates from exhaust gas from the internal combustion engine.

23. The honeycomb body according to claim 22, wherein the internal combustion engine is a diesel engine.

24. A honeycomb body, comprising:
an entry surface and an exit surface defining a honeycomb body width therebetween;
subregions disposed between said entry surface and said exit surface;
an inner region of the honeycomb body;
layers, including adjacent layers, extended continuously across said honeycomb body width, having inner walls defining passages leading from said entry surface to said exit surface, said passages having a mean cross-sectional area;
a plurality of cavities disposed in said layers in at least one of said subregions, said cavities each being defined by a plurality of mutually aligned holes in said adjacent layers, being free of said inner walls and being shaped and dimensioned to contain at least one spherical free space, said plurality of cavities being accumulated in said inner region of the honeycomb body;
said at least one spherical free space having a largest cross-sectional area amounting to at least 10 times said mean cross-sectional area of said passages in said at least one subregion; and
not all of said passages intersect the same cavity of said plurality of cavities.

25. The honeycomb body according to claim 1, wherein said passages are mutually aligned from said entry surface to said exit surface.

26. The honeycomb body according to claim 15, wherein said passages are mutually aligned from said entry surface to said exit surface.

27. The honeycomb body according to claim 16, wherein said passages are mutually aligned from said entry surface to said exit surface.

28. The honeycomb body according to claim 24, wherein said passages are mutually aligned from said entry surface to said exit surface.

29. The honeycomb body according to claim 1, wherein the honeycomb body has a constant cross-section from said entry surface to said exit surface.

30. The honeycomb body according to claim 15, wherein the honeycomb body has a constant cross-section from said entry surface to said exit surface.

31. The honeycomb body according to claim 16, wherein the honeycomb body has a constant cross-section from said entry surface to said exit surface.

32. The honeycomb body according to claim 24, wherein the honeycomb body has a constant cross-section from said entry surface to said exit surface.

* * * * *